United States Patent Office.

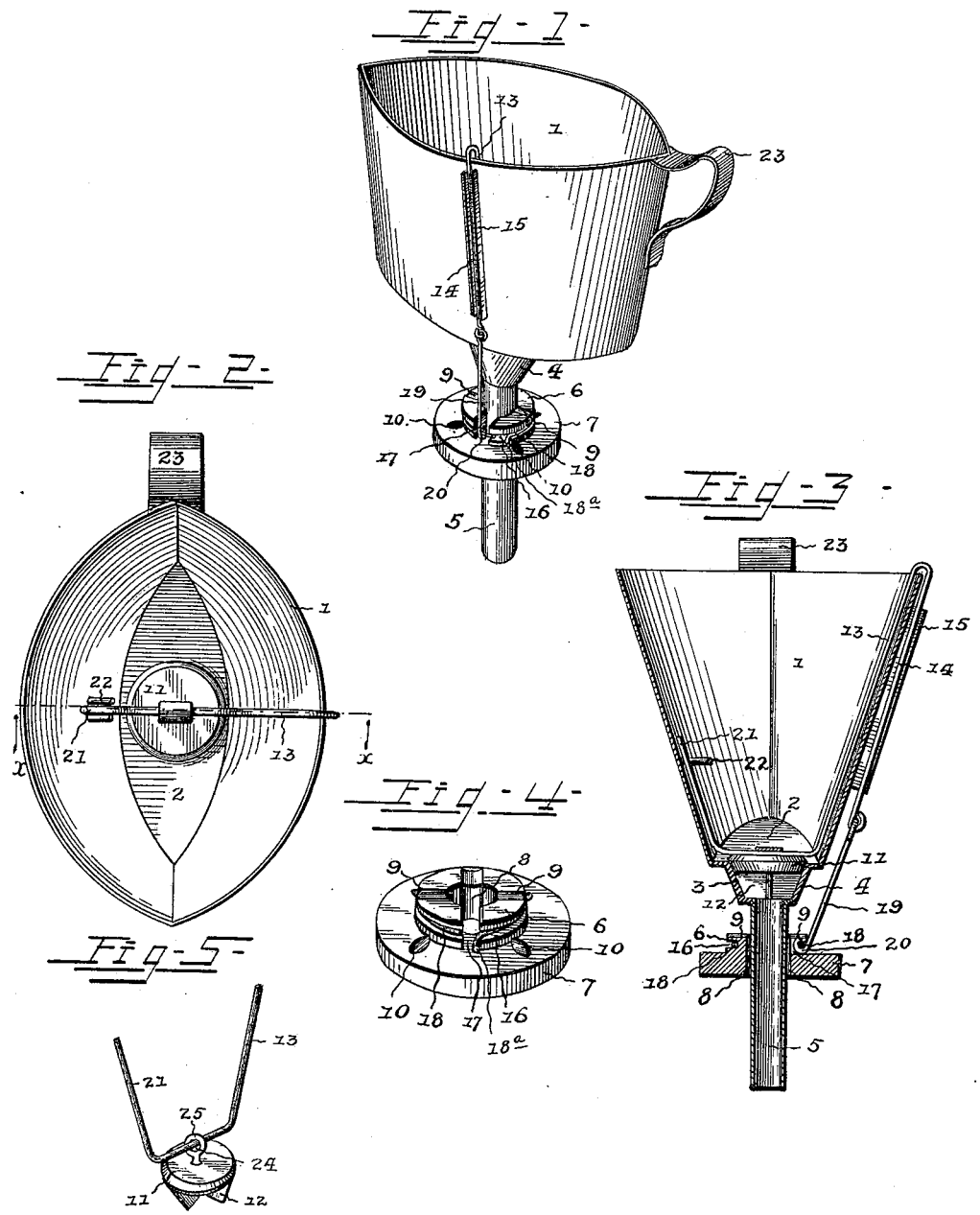

JOHN B. PARADIS, OF BIDDEFORD, MAINE.

FUNNEL.

SPECIFICATION forming part of Letters Patent No. 619,836, dated February 21, 1899.

Application filed February 14, 1898. Serial No. 670,250. (No model.)

*To all whom it may concern:*

Be it known that I, JOHN B. PARADIS, a citizen of the United States, residing at Biddeford, in the county of York and State of Maine, have invented a new and useful Funnel, of which the following is a specification.

This invention relates to funnels used for filling bottles, jugs, and similar vessels with liquid, the object being to provide such funnel with a valve in its discharge-spout which will automatically open or close on the insertion of the spout in or its withdrawal from the mouth of the vessel, whereby the flow of liquid can be controlled with accuracy and instantaneously stopped by merely lifting the funnel.

With these objects in view the invention consists of the several details of construction and combination of parts, as will be hereinafter fully described, and particularly pointed out in the claims.

In the drawings, Figure 1 is a perspective view of a funnel made in accordance with my invention. Fig. 2 is a top plan view. Fig. 3 is a vertical transverse section on the line *x x* of Fig. 2. Fig. 4 is a perspective view of the flanged collar, adapted to be slidably mounted on the spout of the funnel, detached. Fig. 5 is a detail view showing another way of connecting the lifting-rod to the valve.

Like numerals of reference designate similar parts in the several figures.

1 designates the bowl of the funnel, which may be constructed of any suitable metal and preferably in the form of an ellipse in plan view, as clearly illustrated in Fig. 2 of the accompanying drawings. The bowl tapers from top to bottom and is provided with a substantially flat bottom. The object in making the bowl in this form is to prevent the centrifugal current which always results when the liquid is poured into the conical bowl of a funnel, and also for the reason that such shape better adapts the funnel to receive a broad thin stream of liquid from an ordinary pouring vessel. The liquid on striking the flat bottom of the bowl will steady itself and not be thrown out of the upper end of the bowl. The bowl is provided with a conical valve-seat 3, preferably formed integral with the bottom 2, and a cylindrical spout depends from the valve-seat.

6 indicates a collar or sleeve loosely fitted on the spout and provided with an annular flange 7 on its lower end. A series of grooves 8 are formed in the wall of the opening in the collar through which the spout passes, and a similar series of grooves 9 are also formed in the upper end of the collar, and the grooves 8 and 9 respectively communicate with each other. A series of perforations 10 are also formed in the flange and collar and extend obliquely from the lower end of the collar to the upper face of the flange just outside of the collar. These openings and grooves are to provide a free vent for the air in the bottle or other vessel when being filled.

11 indicates a valve adapted to fit in the upper end of the valve-seat 3, and this valve is provided with a series of tapered wings projecting from its lower face and adapted to engage the lower portion of the valve-seat 3 and guide the valve to its seat. The valve proper will be comparatively thin in order that it will only be necessary to give it a slight vertical movement in order to make an opening of sufficient area for the passage of the liquid through the spout to the full capacity of the latter.

13 indicates a lifting-rod consisting of a piece of wire secured to the upper face of the valve and extending up from the edge thereof at an inclination corresponding to the inclination of the side of the bowl, against which it will rest. The wire is bent upon itself to form an arm 14, which extends down on the outside of the bowl between spaced guiding-ribs 15, formed on the outer face of the bowl in any suitable manner. The collar 6 is provided with a circumferential groove 16 and with a vertically-disposed recess 17, which intersects the groove 16. A spring split ring 18 is seated in the groove 16, and is adapted to have axial movement therein.

19 indicates a link pivotally connected at its upper end to the lower end of the arm 14 and having an eye 20 at its lower end to seat in the recesses 17, and through which eye the ring 18 passes, thus connecting the arm 14 and valve-rod 13 to the collar. Either end of the split ring 18 may be bent outward to form a handle 18ª, which facilitates the assembling of the parts of the device and enables the same to be readily separated when desired.

The ends of the split ring are spaced apart sufficiently to permit the eye 20 to pass between them, and by moving the ring in the groove it can be engaged or disengaged with the eye, and the link can therefore be easily connected or disconnected from the collar, and when disconnected the valve can be lifted entirely out of the bowl for the purpose of cleaning it or otherwise.

21 indicates a guide-arm also secured to the upper face of the valve and projecting upwardly from the edge thereof opposite the valve-rod, and this guide-arm is adapted to work between guide-pins 22, secured to and projecting from the inner face of the bowl.

Preferably the arm 14, valve-rod 13, and arm 21 will be formed from a single piece of wire, but this is not essential.

23 indicates a handle secured to one end of the bowl in any suitable manner.

The valve-seat extends almost the full width of the bottom at its upper end, and as the valve will be comparatively thin it will require but little vertical movement to form an opening of sufficient area to permit the free flow of liquid to the full capacity of the spout, and the liquid will consequently flow into the vessel very rapidly. The guide-wings on the valve will offer little obstruction to the flow of the liquid, but will serve to accurately guide the valve to its seat when necessary. As the valve only moves a very short distance vertically, it is obvious that the flow of liquid can be shut off almost instantaneously, and consequently the vessel can be filled to the desired point with great accuracy.

Assuming the parts to be in the position indicated in Fig. 1, the spout will be inserted in the mouth of the vessel and the flange will rest upon the upper end of the vessel, and the weight of the funnel will be sufficient to bring the lower end of the block 4 into contact with the upper face of the collar, and this will result in lifting the valve off its seat. As soon as sufficient liquid has passed into the bottle the operator will lift the funnel, and the weight of the collar and the valve will cause the latter to return to its seat simultaneously, and the flow of liquid will be cut off.

These funnels may be of any desired shape and, if desired, may have a scale on their inner face to indicate different quantities, so that the funnel itself may be used as a measuring vessel.

It is well known that the centrifugal current, which so frequently occurs in conical funnels, greatly retards the passage of the liquid through the spout and also often causes part of the liquid to be thrown out of the top of the funnel. By my invention the centrifugal current is entirely prevented, and consequently there will be no waste of the liquid by being thrown out of the top of the funnel, and the flow of the liquid from the funnel will be uniform and constant, thus saving much time in filling the bottles or other vessels. In this connection while I prefer to make the bowl of the funnel in the form of an ellipse throughout its depth the same results will be achieved if the lower portion of the bowl be elliptical and the upper portion circular or other desired form.

It will be understood that changes in the form, proportion, and the minor details of construction may be resorted to without departing from the spirit or sacrificing any of the advantages of this invention—as, for instance, instead of soldering or otherwise rigidly connecting the lifting-rod to the valve an eye 24 may be formed in a lug 25, extending up from the center of the valve, and the lifting-rod 13 and guide-arm 21 may be formed of a single piece of wire extending through said eye, as shown in Fig. 5. The connection between the valve and lifting-rod being loose, the valve will be free to seat, even should the lifting-rod be bent a little by accident or otherwise. Also instead of forming the annular groove 16 in the collar 6 it might be in the flange 7. In some cases also the perforations 10 may be omitted and the grooves 8 only be used to prevent the vessel being filled.

Having thus described the invention, what I claim is—

1. A funnel having an elliptical tapered bowl provided with a substantially flat bottom, a spout leading from the bottom, and an automatically-operated valve controlling communication between the bowl and the spout, substantially as described.

2. In a funnel, the combination with a tapered bowl having a substantially flat bottom, said bottom being provided with a conical valve-seat, of a spout secured in said bottom and communicating with the valve-seat, a thin conical valve having tapering guide-wings on its lower face to fit in said valve-seat, a collar slidably mounted on the spout, and connections between the collar and valve, substantially as described.

3. In a funnel, the combination with a tapered bowl having a substantially flat bottom, said bottom being provided with a conical valve-seat, of a spout secured in said bottom and communicating with the valve-seat, a thin conical valve having tapering guide-wings on its lower face to fit in said seat, a flanged collar slidably mounted on the spout and provided with vent-openings, and connections between the collar and valve, substantially as described.

4. In a funnel, the combination with an elliptical tapered bowl having a substantially flat bottom, said bottom being provided with a conical valve-seat extending at its upper end substantially the full width of the bottom, of a spout secured in said bottom and communicating with the valve-seat, a thin conical valve having tapering guide-wings on its lower face to fit in said valve-seat, a collar slidably mounted on the spout, and connections between the collar and valve, substantially as described.

5. In a funnel, the combination with a tapered bowl having a substantially flat bottom provided with a valve-seat, of a spout secured in the bottom of the bowl and communicating with the valve-seat, a valve fitting in the seat, a rod connected to the valve and extending up the inner side of the bowl, an arm connected to the upper end of the rod and seated between guides on the outer face of the bowl, a sliding collar on the spout to which said arm is connected, a guide-arm on the valve opposite the said rod, and spaced pins on the inner face of the bowl between which the guide-arm works, substantially as described.

6. In a funnel, the combination with the bowl, of a spout leading from the bottom thereof, a valve controlling communication between the bowl and the spout, a collar slidably mounted on the spout and having a circumferential groove and a vertically-disposed recess intersecting the groove, a spring split ring seated in said groove and having its ends spaced apart, a link having an eye at one end to seat in said recess and receive the ring, and connections between the other end of the link and said valve, substantially as and for the purpose specified.

7. In a funnel, the combination with the bowl, of a spout leading from the bottom thereof, a valve controlling communication between the bowl and the spout, a collar slidably mounted on the spout and having a circumferential groove and a vertically-disposed recess intersecting the groove, a link connected at its upper end with the valve and provided with an eye arranged in the said recess, and a split ring arranged in the circumferential groove of the collar and engaging the eye of the link, one end of the ring being bent outward to form a handle, substantially as described.

8. In a funnel, the combination of a bowl provided at its bottom with a valve-seat, a spout, a valve controlling the communication between the bowl and spout, a collar slidingly mounted on the spout, a lifting-rod connected with the valve and arranged on the inner face of one side of the bowl and provided with a depending arm arranged on the exterior of the same side of the bowl, an upwardly-extending arm connected with the valve and located on the inner face of the opposite side of the bowl, guides arranged on the inner and outer faces of the bowl and receiving the said arms, and a link connecting the depending arm and the collar, substantially as described.

9. In a funnel, the combination of a bowl provided at its bottom with a valve-seat, a spout, a valve controlling communication between the bowl and the spout, a sliding collar mounted on the spout and provided in the walls of its opening with grooves and having grooves at its upper face communicating with the said grooves to form vents, said collar being also provided with inclined perforations extending through it, and connections between the collar and the valve, substantially as described.

In testimony that I claim the foregoing as my own I have hereto affixed my signature in the presence of two witnesses.

JOHN B. PARADIS.

Witnesses:
CHAS. E. CROSHER,
P. H. BEAUREGARD.